US008983963B2

(12) United States Patent
Fittges et al.

(10) Patent No.: US 8,983,963 B2
(45) Date of Patent: Mar. 17, 2015

(54) TECHNIQUES FOR COMPARING AND CLUSTERING DOCUMENTS

(75) Inventors: Klaus Fittges, Pfungstadt (DE); Khalid El Mansouri, Alsbach-Haehnlein (DE)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 13/177,849

(22) Filed: Jul. 7, 2011

(65) Prior Publication Data

US 2013/0013612 A1 Jan. 10, 2013

(51) Int. Cl.
G06F 7/00 (2006.01)
G06F 17/30 (2006.01)

(52) U.S. Cl.
CPC .... *G06F 17/30707* (2013.01); *G06F 17/30171* (2013.01)
USPC .......................................... 707/739; 707/749

(58) Field of Classification Search
USPC ......................................................... 707/739
See application file for complete search history.

(56) References Cited

U.S. PATENT DOCUMENTS

| 4,839,853 | A | 6/1989 | Deerwester et al. | |
| 5,920,854 | A * | 7/1999 | Kirsch et al. | 1/1 |
| 6,289,354 | B1 * | 9/2001 | Aggarwal et al. | 1/1 |
| 6,701,305 | B1 * | 3/2004 | Holt et al. | 706/45 |
| 6,847,966 | B1 * | 1/2005 | Sommer et al. | 707/739 |
| 7,185,001 | B1 * | 2/2007 | Burdick et al. | 1/1 |
| 8,095,830 | B1 * | 1/2012 | Cohen et al. | 714/45 |
| 2002/0078091 | A1 * | 6/2002 | Vu et al. | 707/513 |
| 2006/0242190 | A1 * | 10/2006 | Wnek | 707/102 |
| 2007/0136065 | A1 * | 6/2007 | Chiu et al. | 704/257 |
| 2007/0156677 | A1 * | 7/2007 | Szabo | 707/5 |
| 2008/0319971 | A1 * | 12/2008 | Patterson | 707/5 |
| 2009/0030894 | A1 * | 1/2009 | Mamou et al. | 707/5 |
| 2010/0049708 | A1 * | 2/2010 | Kawai et al. | 707/5 |
| 2010/0281030 | A1 * | 11/2010 | Kusumura et al. | 707/741 |
| 2011/0225159 | A1 * | 9/2011 | Murray | 707/739 |
| 2012/0330955 | A1 * | 12/2012 | Miura | 707/737 |

OTHER PUBLICATIONS

Scott Deerwester et al., "Improving Information Retrieval with Latent Semantic Indexing," Proceedings of the 51$^{st}$ Annual Meeting of the American Society of Information and Science 25, 1988, pp. 36-40.
Latent Semantic Indexing (LSI). Wikipedia. [retrieved Jul. 7, 2011] http://en.wikipedia.org/wiki/Latent_semantic_indexing.

(Continued)

*Primary Examiner* — James E Richardson
(74) *Attorney, Agent, or Firm* — Nixon & Vanderhye PC

(57) ABSTRACT

Certain example embodiments relate to techniques for analyzing documents. A plurality of documents/document portions are imported into a database, with at least some of the documents/document portions being structured and at least some being unstructured. The imported documents/document portions are organized into one or more collections. A selection of at least one of the one or more collections is made. An index of words and/or groups of words is built (and optionally refined in accordance with one or more predefined rules) based on each of the document or document portion in each selection. A document-word matrix is built (and optionally weighted using a semantic approach), with the matrix including a value indicative of a number of times each word and/or group of words in the index appears in each document/document portion. One or more clusters of documents are generated using the document-word matrix.

31 Claims, 11 Drawing Sheets

(56) References Cited

OTHER PUBLICATIONS

E-Discovery Knowledge Center: Fios Discovery Management Services. [retrieved Jul. 7, 2011] http://www.fiosinc.com/e-discovery-knowledge-center/default.aspx.

Giovanna Roda et al., "CLEF-IP 2009: Retrieval Experiments in the Intellectual Property Domain." [retrieved Jul. 7, 2011].

Gyorgy Szarvas et al., "Prior Art Search Using International Patent Classification Codes and All-Claims-Queries." [retrieved Jul. 7, 2011].

Manu Konchady, "Text Mining Application Programming," pp. 272-275, Copyright 2006.

Berry et al., "Understanding Search Engines: Mathematical Modeling and Text Retrieval", Second Edition, Copyright 2005 Society for Industrial and Applied Mathematics; pp. 1-136.

Andauer et al., "Handbook of Latent Semantic Analysis", Copyright 2007 Lawrence Erlbaum Associates., pp. 1-8 (including introduction and table of contents).

* cited by examiner

|  | $D_1$ | $D_2$ | $D_3$ | $D_4$ |
|---|---|---|---|---|
| ARCHITECTURE | 0,0000 | 0,0000 | 1,0000 | 0,0000 |
| GUIDE | 1,0000 | 0,0000 | 0,0000 | 0,0000 |
| REFERENCE | 1,0000 | 0,0000 | 0,0000 | 0,0000 |
| SCHEMA | 1,0000 | 0,0000 | 0,0000 | 0,0000 |
| SEMANTIC | 0,0000 | 0,0000 | 0,0000 | 1,0000 |
| TAMINO | 1,0000 | 1,0000 | 0,0000 | 0,0000 |
| TOOL | 0,0000 | 1,0000 | 0,0000 | 0,0000 |
| W3C | 0,0000 | 0,0000 | 1,0000 | 1,0000 |
| WEB | 0,0000 | 0,0000 | 1,0000 | 1,0000 |
| XML | 1,0000 | 0,0000 | 0,0000 | 0,0000 |
| XQUERY | 0,0000 | 1,0000 | 0,0000 | 0,0000 |

Fig. 3A

|  | $D_1$ | $D_2$ | $D_3$ | $D_4$ |
|---|---|---|---|---|
| ARCHITECTURE | 0,0000 | 0,0000 | 0,1667 | 0,1667 |
| GUIDE | 0,1602 | 0,1602 | 0,0000 | 0,0000 |
| REFERENCE | 0,1602 | 0,1602 | 0,0000 | 0,0000 |
| SCHEMA | 0,1602 | 0,1602 | 0,0000 | 0,0000 |
| SEMANTIC | 0,0000 | 0,0000 | 0,1667 | 0,1667 |
| TAMINO | 0,2265 | 0,2265 | 0,0000 | 0,0000 |
| TOOL | 0,0664 | 0,0664 | 0,0000 | 0,0000 |
| W3C | 0,0000 | 0,0000 | 0,3333 | 0,3333 |
| WEB | 0,0000 | 0,0000 | 0,3333 | 0,3333 |
| XML | 0,1602 | 0,1602 | 0,0000 | 0,0000 |
| XQUERY | 0,0664 | 0,0664 | 0,0000 | 0,0000 |

Fig. 3B

| DerwentAbstracts | 91 | | ☐ |
|---|---|---|---|
| Patents | 91 | 91 | |
| PatentClaims | 0 | 0 | ⊗ | analyze with word pairs
save clustering result
compare Documents search

Cluster List (25)

| Filter | |
|---|---|
| Word Remove | |

| Cluster | #Documents | #Buzzwords | Buzzwords | details |
|---|---|---|---|---|
| C00 | 16 | 624 | rules(14/534) plurality(9/255) computing(15/147) set (11/146) fact(5/144) engines(9/139) | |
| C01 | 13 | 444 | adapts(7/203) plurality(10/190) agent(4/122) memory(6/111) backup(2/80) servicing(10/67) | |
| C02 | 2 | 101 | messaging(2/91) interpretation(1/17) storing(2/13) access(2/9) accessing(2/9) | |
| C03 | 5 | 256 | rules(5/135) business(5/61) process(5/76) processors(5/76) log(3/48) program(5/42) | |
| C04 | 3 | 133 | servicing(3/130) filing(2/75) xquery(2/44) access(2/47) accessing(2/47) | |
| C05 | 8 | 352 | rules(8/599) templates(3/158) set(5/99) receiving(6/93) generically(6/103) enginea(6/74) | |
| C06 | 2 | 97 | multipool(1/52) connections(1/47) pool(1/34) select(2/8) curve(1/7) unit(1/32) revived(1/4) | |
| C07 | 3 | 90 | triggers(1/116) subsystem(1/81) messaging(3/63) basic(3/36) layers(1/30) sql(2/26) | |
| C08 | 13 | 330 | xml(12/575) query(7/279) tokens(6/276) stream(5/146) repre-sentational(5/127) | |
| C09 | 1 | 69 | assertions(1/36) soa(1/53) low(1/16) policy(1/37) level(1/32) object(1/51) inconsistent(1/8) | |
| C10 | 2 | 92 | presentations(1/93) definitions(1/80) identity(2/70) visually(1/35) sign(1/31) | |
| C11 | 1 | 96 | point(1/96) sizes(1/60) rpc(1/40) wired(1/27), marshaling(1/22), null(1/19) compiling(1/43) | |

Fig. 7

Cluster: C00 with 16 Documents.
⦿ Buzzwords and Buzzword Pairs ○ Buzzwords ○ Buzzword Pairs

| Cluster Buzzwords |
|---|
| Rules(14/534) Plurality(9/255) Computing(15/147) Set(11/146) Fact(5/144) Engines(9/139) Generically(11/134) Enginea(9/133) Object(8/129) Build(1/118) Display(4/103) Rule Engines(7/103) Input(10/102) Conditions(5/100) Business Rules(5/95) Actions(5/81) Business(5/103) Executing(13/81) Basic(11/78) Elements(7/70) Storing(11/69) Constraint(2/68) Products(6/67) Manually(6/104) Medium(12/92) Memory(9/70) Read(10/66) Defining(11/65) Form(8/64) Pair(1/64) Values(3/64) Program(7/61) Structures(8/60) Call(3/57) Edit(3/63) List(5/55) Sourcing(2/55) Receiving(10/54) Creating(8/52) Process(14/52) Processors(14/52) Perform(15/50) Attributes(6/49) Interfaces(9/49) Link(4/47) Platform(2/44) Devices(5/43) Operations(5/43) Orders(6/43) Readable Medium(9/43) Executions(6/42) Chain(4/41) Requiring(4/42) Responsible(7/42) Compiling(2/41) Inclusion(10/40) Plurality Rules(5/40) Apparatus(7/39) Languages(5/39) Servicing(8/39) Builder Call(1/34) Composite(1/34) Composite Key(1/34) Editable List(1/33) Compiled Platform (1/29) Hash(1/34) Key(1/34) Ontology(1/38) Rule Set(5/34) Rules Set(5/34) Pre(3/33) Multiple(4/32) Nodes(4/57) Model(4/53) Graph(4/32) Evaluator(6/31) Network(6/32) Specifically(3/32) Formats Operations(1/30) Functions(5/30) Formatted(4/27) Log(4/30) Input Nodes(2/27) Intermediate(4/27) Pattern(2/27) Infers(4/26) Level(4/28) Rulebased(2/25) Techniques(2/31) Technical Assertions(1/30) Match(2/28) Modules(7/25) Expressions(6/24) Multiple Input(1/24) Operators(8/24) Quadrants(1/24) Result(5/24) Distributing(2/23) Enabling(7/23) Forward(3/23) Remotely(2/23) Tree(4/23) Rule Rules(4/23) Graphical Interfaces(3/22) Accordance(3/22) Depend(3/22) Index(3/26) Definitions(3/26) Implements(3/26) Descriptor(2/23) Configuring(3/22) Coupling(7/22) Sequentially(4/22) Set Rules(5/22) Sets Rules(5/22) Regeneration(1/21) Plurality Memory(1/20) Level Program(1/23) Source Ontology(1/20) Core(3/19) Decision Rules (1/19) Dynamically(4/19) Indicators(4/23) Hierarchically(2/22) High Level(2/24) Higher Level(2/24) Identity(5/19) Rule Languages(2/19) Schemas(2/20) Machines(4/18) Provisioning(4/20) Specific Business(1/18) Annotated(1/17) Chain Rules(2/17) Instances(4/17) Messaging(3/17) Conditional Rules(2/16) Construct(2/16) Plurality Composite(1/15) Pattern Match(1/17) Mutually Exclusive(1/17) Fact Asserted (1/16) Facts Asserted(1/16) Plurality Descriptor(1/15) Hashing Plurality(1/13) Annotated Set(1/14) Descriptor Classes(1/16) Ruleflow(1/17) Assertions(1/30) Gui(1/20) Generative Model(1/19) Asserted(2/17) Serializing(3/16) Side Business(1/16) Term(1/22) Work(6/21) Working Memory(5/20) Updating(4/17) Components(4/15) Constraint Set(1/15) Profiles(1/15) Mutually(1/17) Hierarchy(1/17) Exclusive(1/17) Engine Core(2/14) Group(4/14) Receive Input(2/14) Received Input(2/14) Receiving Input(2/14) Base Set(2/13) Based Set(2/13) Base Rules(2/20) Based Rules(2/20) Basic Rules(2/20) Claimed(2/21) Carrying(2/16) Attachments(2/18) Assign(2/22) Query(2/40) Class(2/18) Classes(2/18) Communicatively(6/14) Builder Input(1/13) Carrier Medium(1/13) Changing(2/13) Definition Model(1/13) Embodying(8/13) Facts Fact(3/13) Utilizing(4/13) Xml(4/15) Bucket(1/12) Browsing(1/17) Dependency Tree(1/15) Placing(3/12) Driving(3/12) Predetermined(3/13) Plurality(1/11) Builders Plurality(1/11) Building Plurality(1/11) Plurality Attributes(1/11) Assertions Presents(7/13) Elements Plurality(2/12) Rules Executing(2/12) Assertion Plurality(1/11) Decisions(1/20) Constraints Constraint(1/13) Execute Rules(4/11) Executing Rules(4/11) Position Pair(1/11) Specific Fact(1/11) List Value(1/11) Additionally(4/10) Access(4/15) Accessing(4/15) Determining(4/12) Declarative(3/11) Current(3/13) Interface Elements(2/10) Deriving(2/11) Contents(3/10) Dimensional(1/10) Translation(1/10) Tag(1/12) Optimizing(1/14) Mark(3/11) Storage Medium(3/11) Mapping(3/13) Means(3/39) Matrix(1/18) Program |

Fig. 8

| Buzzword | # Cluster Doc Appear | # Collection Appear | % Appear Quota | # Relative Appear | # Relative Freq | # Cluster Doc Freq | # Collection Freq | % Freq Quota | Cluster Documents |
|---|---|---|---|---|---|---|---|---|---|
| RULES | 14 | 75 | 18.67 | 2.61 | 124.58 | 534 | 2289 | 23.33 | Proctor&Tirelli - US20080222397A1.txt |
| PLURALITY | 9 | 44 | 20.45 | 1.84 | 97.33 | 255 | 668 | 38.17 | Bow Street SW - WO2003046694A2.txt |
| COMPUTING | 15 | 125 | 12.0 | 1.8 | 30.43 | 147 | 710 | 20.7 | Proctor & Tirelli - US20090222386A1.txt |
| SET | 11 | 84 | 13.1 | 1.44 | 28.34 | 146 | 752 | 19.41 | McWhirter&Proctor&Tirelli - US20080301078A1.txt |
| FACT | 5 | 15 | 33.33 | 1.67 | 114.57 | 144 | 181 | 79.56 | SAP - US20090113387A1.txt |
| ENGINES | 9 | 66 | 13.24 | 1.19 | 35.44 | 139 | 545 | 25.5 | |
| GENERICALLY | 11 | 75 | 14.67 | 1.61 | 27.46 | 134 | 654 | 20.49 | Magnum Communications - US20080267999A1.txt |
| ENGINE | 9 | 68 | 13.24 | 1.19 | 34.49 | 133 | 513 | 25.93 | P0501US - US7293010B2.txt |
| OBJECT | 8 | 43 | 18.6 | 1.49 | 39.24 | 129 | 424 | 30.42 | P0201US - US7499936B2.txt |
| BUILD | 1 | 4 | 25.0 | 0.25 | 96.03 | 118 | 145 | 81.38 | Lin-Tablet - US20050246301A1.txt |
| DISPLAY | 4 | 23 | 17.39 | 0.7 | 60.98 | 103 | 174 | 59.2 | SAP - EP2120195A1.txt |
| BUSINESS | 5 | 45 | 11.11 | 0.56 | 20.1 | 103 | 528 | 19.51 | P0710US - US20080229195A1.txt |
| INPUT | 10 | 62 | 16.13 | 1.61 | 28.04 | 102 | 371 | 27.49 | P0011US - US6754648B1.txt |
| CONDITIONS | 5 | 24 | 20.83 | 1.04 | 48.78 | 100 | 205 | 48.78 | Microsoft - US20080071720A1.txt |
| MEDIUM | 12 | 84 | 14.29 | 1.71 | 19.37 | 92 | 437 | 21.05 | Proctor&Verlaenen - US20080301079A1.txt |
| ACTIONS | 5 | 22 | 22.73 | 1.14 | 33.31 | 81 | 197 | 41.12 | Corticon - WO2002044854A2.txt |
| EXECUTING | 13 | 92 | 14.13 | 1.84 | 13.45 | 81 | 488 | 16.6 | Softlaw Corp & Andrew & Barry - WO2004044840A1.txt |
| CONSTRAINT | 2 | 5 | 40.0 | 0.8 | 47.57 | 68 | 97 | 70.1 | |
| PRODUCTS | 6 | 33 | 18.18 | 1.09 | 34.27 | 67 | 131 | 51.15 | |
| READ | 10 | 54 | 18.52 | 1.85 | 23.67 | 66 | 184 | 35.87 | |

Fig. 9

|  | Percent |
|---|---|
| DocA: | SAP-EP2120195A1.txt |
| | P0501US- |
| | US7293010B2.txt :DocB |
| | 65.77 % |

Similar Buzzwords

Additionally(6-1) Basic(19-10) Computer Computing(2-3) Computer Executing(3-2) Computing(28-21) Conform(1-4) Declarative(1-5) Enabling(2-1) Evaluation(2-1) Evaluator(9-2) Executing(14-6) Expressions(2-1) Form(2-2) Medium(1-5) Medium Storing(1-1) Memory(2-1) Modules(1-1) Network(3-3) Operators(7-1) Perform(3-6) Platform(43-1) Preferred(1-1) Process(4-1) Processors(4-1) Read(1-2) Readable Medium(1-1) Rules(63-16) Servicing(14-3) Stored Thereon(1-1) Storing(3-9) Thereon(1-1) Translator(2-2) Web(2-3)

Document A Buzzwords

Rules(63) Business(56) Platform(43) Compiling(40) Fact(36) Specifically(29) Pre(29) Computing(28) Engines(22) Engine(22) Sides(21) Basic(19) Browsing(17) Set(14) Executing(14) Servicing(14) Definitions(13) Model(13) Receiving(11) Implements(10) Subset(9) Configuring(9) Evaluator(9) Accordance(8) Deriving(8) Conditions(7) Interfaces(7) Communicatively(7) Operators(7) Additionally(6) Formatted(5) Inclusion(5) Process(4) Elements(4) Communications(4) Asynchronous(4) Processors(4)

Document B Buzzwords

Sourcing(47) Ontology(38) Query(30) Computing(21) Scheme(18) Schemas(18) Mapping(17) Means(17) Integration(16) Rules(16) Construct(14) Program(13) Basic(10) Log(9) Storing(9) Predicative(9) Languages(8) Perform(6) Executing(6) Plurality(6) Medium(5) Declarative(5) Structures(5) Input(4) Unit(4) Infers(4) Group(4) Conform(4) Accomplishing(4) Web(3) Network(3) Level(3) Defining(3) Adapts(3) Reliably(3) Servicing(3) Integrity(3) Therewith(3) Form(2) Dynamically(2) Devices(2) Load(2) Enterprises(2)

Fig. 10

TECHNIQUES FOR COMPARING AND CLUSTERING DOCUMENTS

FIELD OF THE INVENTION

Certain example embodiments described herein relate to techniques for comparing and clustering documents together. More particularly, certain example embodiments relate to techniques for analyzing documents, regardless of whether they are structured or unstructured, so as to enable comparisons to be made between such documents. In certain example embodiments, structured and unstructured documents are imported into a database, a word/word pair/group of words index is generated and refined, and document-word matrix for the documents are weighted using semantic analysis techniques. The weighted document-word matrix may be used to cluster the documents, enabling comparisons to be made.

BACKGROUND AND SUMMARY OF EXAMPLE EMBODIMENTS OF THE INVENTION

There is an old adage that states, "Knowledge is power." It is perhaps not surprising, then, that records of varying kinds have been kept for thousands of years. From writings or paintings on walls in caves to widely disseminated paper encyclopedias to the vast library of resources available over global networks like the Internet, there has always been a desire to capture information in some form, for both instrumental reasons and because knowledge is an intrinsic good that has value in itself.

As more and more information is recorded, however, the challenge of how to organize and search through it also grows. In many instances, it is desirable to search through documents that may or may not be related to one another, e.g., to uncover related aspects that may be of some relevance. Literature searches are quite common, for example, in science, social science, and other endeavors.

Another area where information retrieval comes into play is in the intellectual property domain. For instance, prior art searches for freedom to operate, invalidity, clearance, and/or other reasons have become a part of everyday business for IP departments at private companies, law firms, and other firms offers such services to others. Prior art searches sometimes come up during the processing/handling of patent ideas generated in a company, when a company has been accused of infringement, when a company is considering whether to undertake a new endeavor, etc.

Some IP professionals use commercially available search systems like the Derwent Patent Research Database by Thomson Innovation, or publicly available search sites like the offerings by USPTO or the European Patent Office. Other tools have come online in recent years including Google Patent Search.

These sources deal almost exclusively with the texts of patents and patent applications. The search engines can therefore tailor their search facilities to the well-known structures of those documents, e.g., to search through sections or headers like "classification", "inventor", "claims", etc. Recently, the Derwent engine has added less-structured texts of major scientific regular publications for larger scientific organizations, like the IEEE.

It may be strategically unwise to rely exclusively on prior art searches through either patent texts or limited scientific texts. Thus, for a mixture of well-structured patent texts and less-structured scientific texts, search techniques have been developed that are based on working with texts on a semantic basis. At first blush, the Latent Semantic Indexing (LSI) technique seems to be well suited to performing such searches. See, for example, S. Deerwester, et al, "Improving Information Retrieval with Latent Semantic Indexing", Proceedings of the 51st Annual Meeting of the American Society for Information Science 25, 1988, pp. 36-40, the entire contents of which are hereby incorporated herein by reference. See also U.S. Pat. No. 4,839,853, the entire contents of which are hereby incorporated herein by reference. LSI is increasingly being used for electronic document discovery (e-discovery) to help enterprises prepare for litigation. LSI's ability to cluster, categorize, and search large collections of unstructured text on a conceptual basis are of value in e-discovery.

Searching by currently available mechanisms typically is limited to either well structured data (like patents) or at least to scientific documents that have been pre-classified a priori, perhaps by applying LSI for semi-automated semantic categorization.

For the institutions that operate professionally and/or scientifically in this domain, the thousands of pages of non-scientific, non-structured, non-legal texts published typically by companies seem uninteresting, as the texts appearing in manuals, marketing brochures, company web pages would typically use not "patentese" or scientific jargon, but rather either plain English or company lingo—especially when it comes to marketing slogans. Owners of databases of well-maintained bodies of patent texts or classified scientific texts may be afraid that their assets would be "spoiled" by including poorly classified text bodies with words varying in their meaning over the years. In addition, the expected data volume would block precious space for more "reasonable" texts, and also could cause problems of accessing company-specific texts like brochures, manuals, and the like. Thus, oftentimes there is little to no motivation for professional or scientific institutions to provide mechanisms to add the "poor relatives" of scientific or legal texts to the general body of searchable assets.

Companies, however, and especially their legal departments and legal counsel, might have different demands. Due diligence (e.g. in cases of litigation or freedom to operate analysis) may require a cross-domain search, involving the commercially uncharted territory of one's own or one's competitors' marketing brochures, manuals, conference speeches, etc. As indicated above, however, those texts typically are outside of the scope of the above-mentioned approaches, as the company-specific requirements cannot normally be generalized to be of use for the general public.

Thus, it will be appreciated by those skilled in the art that there is a need for improved techniques of searching through potentially large collections of structured and unstructured documents to retrieve information of potential interest.

One aspect of certain example embodiments relates to techniques for comparing and clustering text documents in a database with a text retrieval component.

Another aspect of certain example embodiments relates to a system for the automatic analysis of structured and/or unstructured documents. Structured and/or unstructured documents may be input into a database, and a text retrieval module may be in communication therewith. Analysis rules may be input and stored. An analysis module may be provided for performing text comparisons on the documents residing in the database, e.g., using the stored rules. The results of such analysis may be displayed to a user according to user parameters.

In certain example embodiments, a method for analyzing documents is provided. A plurality of documents and/or document portions is imported into a database, with at least some of the documents and/or document portions being structured and with at least some of the documents and/or document portions being unstructured. The imported documents and/or document portions are organized into one or more collections. A selection of at least one of said one or more collections is received (e.g., via a user interface). An index of words and/or groups of words is built based on each said document or document portion in each said selection. A document-word matrix, including a value indicative of a number of times each said word and/or group of words in the index of words and/or groups of words appears in each said document or document portion in each said selection, is built. One or more clusters of documents is generated, via at least one processor, using the document-word matrix.

According to certain example embodiments, a weighted document-word matrix, including a weighted value indicative of a number of times each said word in the index of words appears in each said document or document portion in each said selection, is built, with the weighting being performed in accordance with a semantics-based algorithm. In such a case the one or more clusters of documents may be generated using the weighted document-word matrix. According to certain example embodiments, the semantics-based algorithm involves Latent Semantic Indexing (LSI).

According to certain example embodiments, (a) the index of words and/or groups of words prior to the building of the document-word matrix and/or (b) document-word matrix, is/are refined, with the refining being performed in accordance with one or more predefined rules that may be stored in a database of rules. The one or more predefined rules may include rules, for example, defining semantic and/or non-semantic stopwords and specifying how the defined semantic and/or non-semantic stopwords are to be handled; for standardizing transliterations or suspected transliterations; and/or for applying a stemming algorithm to reduce the size of the index of words and/or groups of words prior to the building of the document-word matrix and/or the document-word matrix.

According to certain example embodiments, the same index or separate indexes may be built for words and for groups of words (e.g., for word pairs). The word pairs may include a given word and one word immediately to the left of the given word.

According to certain example embodiments, linkages between documents in a given cluster may be removed when threshold values indicative of degrees of similarity between two documents are not met. Clustering may be based on a cosine similarity calculation in certain example instances. In some cases, the threshold value may be user specified (e.g., at 80%).

In certain example embodiments, a method for analyzing documents is provided, with the method comprising: organizing a plurality of assets including structured and unstructured documents and/or document portions into a plurality of user-defined collections; enabling a user to select one or more of said user-defined collections for subsequent analysis; building an index of words and/or groups of words based on the documents and document portions in each said selected collection; building a document-word matrix including a value indicative of a number of times each said word and/or groups of words in the index of words and/or groups of words appears in each said document or document portion in each said selection; refining the index of words and/or groups of words, and/or the document-word matrix based on predefined rules stored in a database of rules; weighting entries in the document-word matrix based on a semantic indexing approach; and clustering together, via at least one processor, documents in dependence on the weighted entries.

In certain example embodiments, an asset analysis system is provided. A database is configured to store a plurality of imported assets in one or more collections, with the assets being documents and/or document portions, where at least some of the documents and/or document portions are structured and at least some are unstructured. An asset splitting module, executable via at least one processor, is configured to split the documents and/or document portions into sub-documents and/or sub-document portions automatically and/or based on user input, and store generated sub-documents and/or sub-document portions as assets in the database. A user interface is configured to enable a user to select one or more collections of assets for analysis. An index builder, under control of the at least one processor, is configured to access from the database assets belonging to the one or more selected collections and generate a word and/or group of words index, with the word and/or group of words index including a listing of words appearing in the accessed assets. A rules database is configured to store a plurality of user-defined rules for refining the word and/or group of words index and/or the document-word matrix. A matrix builder, under control of the at least one processor, is configured to build a document-word matrix including a value indicative of a number of times each said word and/or word/pair in the index of words and/or groups of words appears in each said accessed asset. An index refining module, under control of the at least one processor, is configured to refine the word and/or group of words index and/or the document-word matrix, based on rules stored in the rules database. A weighting engine, under control of the at least one processor, is configured to weight entries in the document-word matrix based on a semantic indexing approach. A clustering engine, under control of the at least one processor, is configured to cluster together documents in dependence on the weighted entries.

Non-transitory computer readable storage mediums tangibly storing instructions for performing the above-summarized and/or other methods also are provided by certain example embodiments.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIGS. 3A and 3B show example document-word and LSI-weighted document-word matrices in accordance with an example embodiment;

FIG. 7 shows a portion of cluster list generated from the FIG. 6 example user interface in accordance with certain example embodiments;

FIG. 8 shows a more detailed view of the first cluster shown in the FIG. 7 example user interface, which may be provided in connection with certain example embodiments;

FIG. 9 is an example screenshot showing detailed statistics for the each of buzzwords in accordance with an example embodiment;

FIG. 10 is an example screenshot that may be used to compare two documents in accordance with an example embodiment.

DETAILED DESCRIPTION OF EXAMPLE EMBODIMENTS OF THE INVENTION

Certain example embodiments relate to techniques for automatic semantic analysis of text documents with different text characteristics including, for example, semi-structured and unstructured texts of differing "scientific importance" that would not have a consistent semantic classification under conventional approaches. Certain example embodiments thus relate to techniques for clustering text documents and extracting their conceptual content by establishing associations between those terms that occur in similar contexts. Words used in the same contexts tend to have similar meanings, and this assumption has found to be frequently sufficient to provide a basic semantic clustering. In certain example embodiments, it is possible to make use of different text similarity measures. These techniques may advantageously help to solve the problem of a raw classification/clustering of a large amount of texts without human intervention, thereby preparing the text documents for a detailed inspection.

In certain example embodiments, the approach to the problem of document comparison analysis that is implemented may use known semantic analysis techniques but need not depend on a single technique and may allow for the automatic analysis of both structured and unstructured documents in bulk. In addition, the "rules" for directing the analysis constitute a differing approach to the "query" approaches used by others.

Structured and/or unstructured documents may be input into and stored by a database, with a module providing certain text retrieval features being in communication with the database. The text retrieval features may include, for example, stemming, stopword, transliteration, thesaurus, and/or other functions. The database's query language may provide native support for such features in certain example embodiments. The documents may be made to reside in different collections in the database, e.g., depending on the text domain. For example, different collections may be provided for patent texts, manuals, marketing brochures, etc.

In certain example embodiments, an XML database may be provided. The above and/or other functions may be embedded therein as text retrieval functions in the XQuery language in certain example embodiments. A Java-based "workbench" may allow users to enter (bulks of) documents, typically reflecting sections of texts of patents, scientific publications, marketing brochures, manuals, etc. Users can trigger the document analysis, which may be based on configurable parameters related to text retrieval and other features, from within the workbench. After the analysis, the similarity measurements may be generated according to user parameters, and clusters of documents may be generated, with such clusters optionally being grouped by text similarity.

Figure 1:
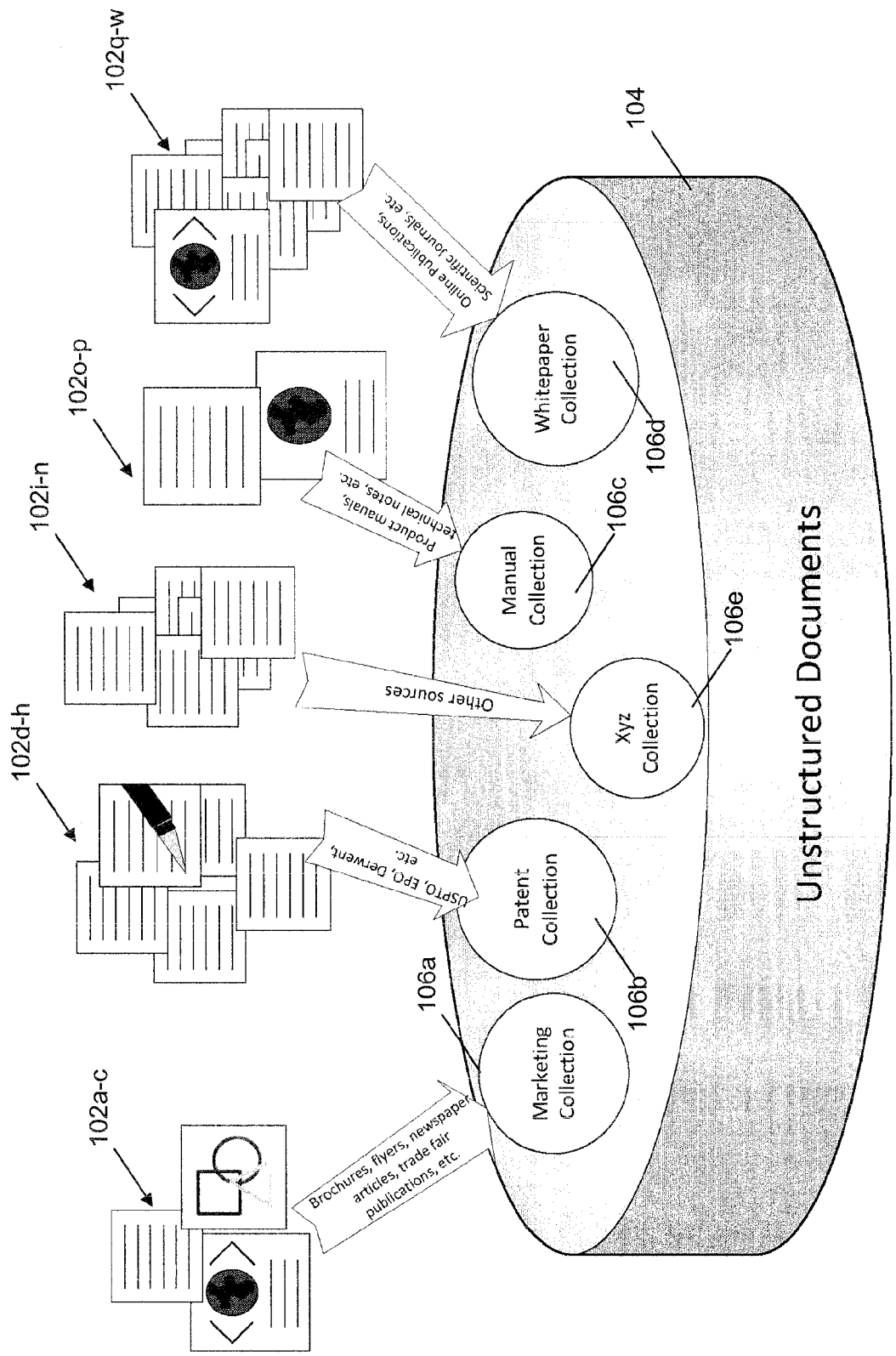
FIG. 1 schematically shows various documents being imported into a database in accordance with certain example embodiments.

Referring now more particularly to the drawings, FIG. 1 schematically shows various documents being imported into a database in accordance with certain example embodiments. A wide variety of different documents 102a-w from different sources is ingested into the database 104. The documents 102a-w may be structured, unstructured, or loosely structured. The documents may be classified as belonging to one of a plurality of pre-defined or user-defined collections 106a-e upon ingest into the database 104. For instance, documents 102a-c (which correspond to brochures, flyers, newspaper articles, trade fair publications, etc.) are classified as belonging to the marketing collection 106a. Documents 102d-h (from the USPTO, EPO, Derwent, etc.) are classified as belonging to the patent collection 106b. Documents 102o-p (which correspond to product manuals, technical notes, etc.) are classified as belonging to the manual collection 106c. Documents 102q-w (which correspond to online publications, scientific journals, etc.) are classified as belonging to the whitepaper collection 106d. Documents from other collections may be classified as belonging to custom defined collections or a catchall "XYZ" collection 106e. Although certain document sources and collections have been described in connection with FIG. 1, it will be appreciated that other document sources, collections, categorization schemes, and/or the like may be implemented in connection with different embodiments of this invention.

It will be appreciated that the classification of the documents into the collections may be performed manually on individual documents or batches of documents (e.g., a user may queue a first set of documents for ingest and specify that the documents in the first set are to be placed into a first specified collection, queue a second set of documents for ingest and specify that the documents in the second set are to be placed into a second specified collection, etc.) in certain example embodiments. In certain example embodiments, batches of documents or individual documents may be categorized automatically based on, for example, recognition of a journal name in a header or footer, known marketing brochure layouts, etc. All or some suspect documents may be flagged for manual review at a later time in certain example embodiments.

In certain example embodiments, it may be desirable to prepare and "clean" ingested text. For instance, it may be desirable to unify or at least create a more unified internal document style. It is known that PDF documents, MS Word documents, HTML documents, LaTeX documents, etc., have different internal styles compared to one another. Individual ones of these document types may have different internal styles compared to other ones of the same document types. Thus, it may be desirable to create a unified or more unified document structure in and/or across document types.

It also may be desirable to improve text quality. This may be done in a number of different ways. For instance, it may be desirable to remove or suppress consideration of irrelevant words, numbers, characters, etc. A list of stopwords may be defined for this purpose. Column and row numbers (e.g., in patent documents), paragraph numbers, etc., similarly may be detected as being in a margin and be ignored or removed accordingly. Text quality can also be improved by treating transliterations (e.g., of proper nouns such as names or places, or other words or phrases) in a more standardized way. For instance, umlauts may be present in some German transliterations, they may be omitted, or they may be transliterated in any number of ways. In certain example embodiments, a standard convention for the treatment may be selected or specified, and a suitable module may operate on the ingested texts to change the spellings of the effected words, e.g., to improve consistency.

Large or multipart documents also may be split into smaller segments in certain example embodiments. In certain example embodiments, some or all irrelevant sections may be removed or marked such that they are to be ignored during subsequent processing. For instance, some manuals cover multiple products or models. Such manuals may be split apart into multiple different manuals for each of the products or models therein. In other cases, it may be desirable to split manuals or textbooks into different chapters, topics, subchapters or sections, etc. Where multiple different technologies are discussed, each such technology may be split into its own document. In the case of patent texts, it may be desirable to retain only the claims and background and summary portions in certain instances, whereas in other instances it may be desirable to group together the claims and summary, and keep this group different from a grouping of the remaining textual portions (e.g., the background and detailed description, etc.). In still other instances, wholly irrelevant sections may be ignored including, for example, the mailing information that oftentimes is found on the outside of mailed brochures. It has been found that document size influences the effectiveness of the clustering, and it also has been found that documents 2-3 pages in length tend to work best. Thus, documents may be split to this size in certain cases. Of course, longer and/or shorter documents can be used in connection with different embodiments of this invention.

It will be appreciated that the database 104 described above may store all the original documents and/or "cleaned" versions of the documents in different example embodiments of this invention. For instance, original documents from the USPTO, EPO, Derwent, etc., may be stored in a first collection. A second collection may be defined for documents in "patentese", which may include only the summaries and claims of the documents. A third collection may be defined to store "layman's English" version of the summaries based on Derwent Patent Indexing. Similarly, brochures, flyers, white papers, etc., may be separated into different collection based on whether they are in layman's English or more technical in nature. Manuals may be separated into different collections based on whether they are manuals for a mother company's products or a competitors products (with each competitor potentially having its own collection, or with competitors being grouped together in some fashion).

It will be appreciated that some or all of the above-described and/or other techniques may be used to prepare or clean the texts in different example embodiments of this invention.

Figure 2:
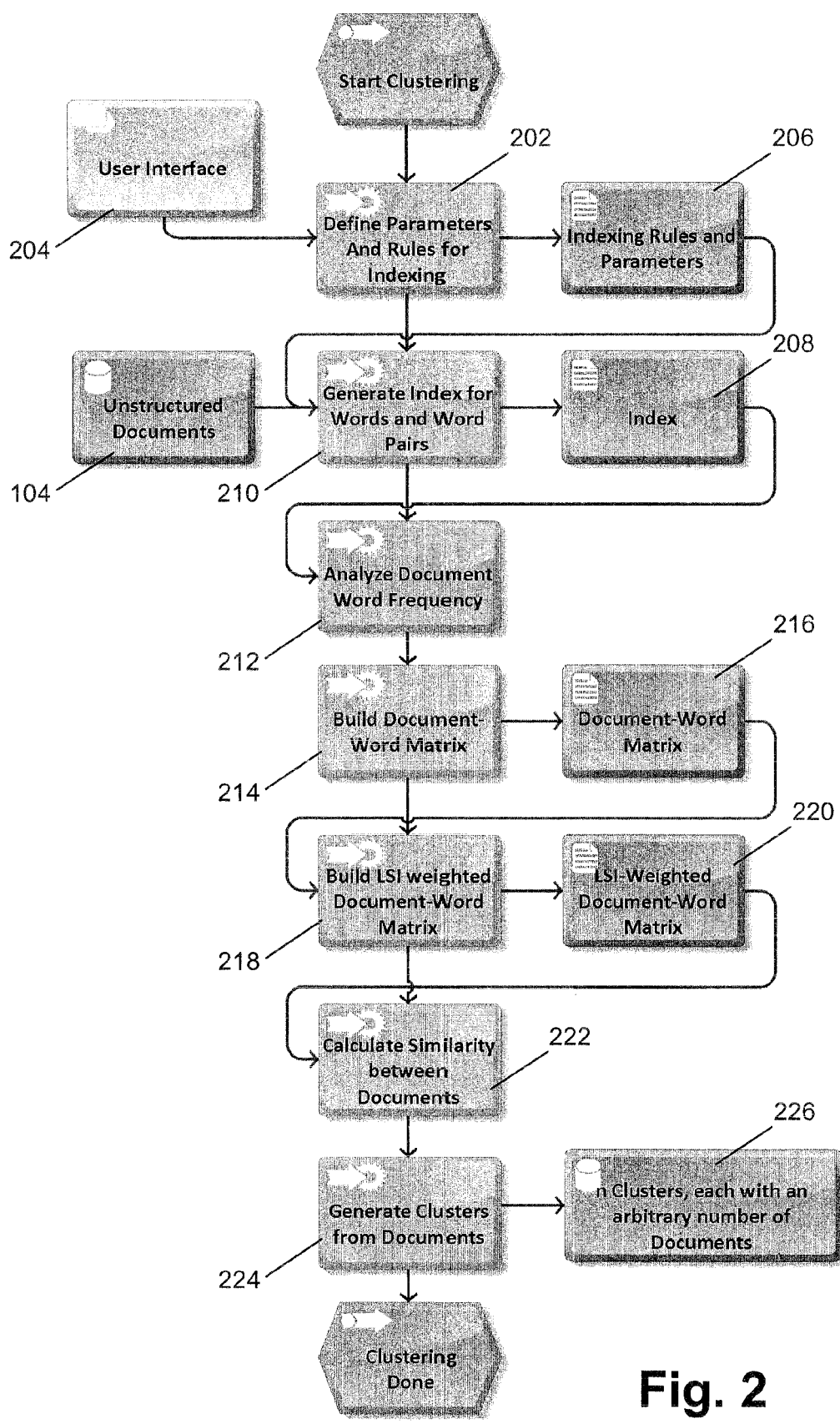
FIG. 2 shows example structural components and process steps that may be taken in accordance with certain example embodiments.

FIG. 2 shows example structural components and process steps that may be taken in accordance with certain example embodiments. In certain example embodiments, the FIG. 2 process steps may be thought of as belonging to one of several larger activities, namely, document/database parameter and rule definition, text analysis, and clustering. These broader activities will each be discussed in greater detail below. It will be appreciated, however, that the activities may be performed independently of one another in different example embodiments, e.g., such that different embodiments may incorporate any suitable combination or sub-combination of these and/or other broadly grouped activities.

Example parameters and rules may be defined in process 202, e.g., with the aid of a user interface 204 operating on at least one computer and under the control of at least one processor. The parameters and rules may be stored in a suitable storage location 206. Several example techniques that may be associated with the document/database parameter and rule definition activity have been identified and discussed above. As alluded to above, stopwords may be defined. The stopwords may be classified as being non-semantic stopwords (e.g., words like "and", "because", "also", "while", etc.) or semantic stopwords (e.g., words like "novelty", "claim", "abstract", etc.). Stemming may be applied, e.g., to find semantically equivalent words. For instance, stemming may be applied so that the words "connect", "connected", "connecting", "connection", etc., are to be treated as being semantically equivalent to one another. There are a variety of stemming approaches that may be used in connection with different embodiments including, for example, the Porter Algorithm, brute force algorithms, the production technique, suffix-stripping algorithms, lemmatization algorithms, stochastic approaches, n-gram analysis, affix stemmers, matching algorithms, hybrid approaches, and/or the like.

The documents stored in the collections in the database 104 may be treated as being completely unstructured, regardless of whether they originally were structured, unstructured, or loosely structured. The documents treated as such, however, may be converted into structured documents. For instance, once the parameters and rules are defined (e.g., as in process 202), a word and word pair index 208 may be generated in process 210, e.g., using relevant parameters and rules 206 as a guide. Although a single index 208 is shown in FIG. 2, it will be appreciated that separate indexes may be maintained for the words and groups of words (e.g., word pairs) in different example embodiments. The index(es) may be stored in an XML database (e.g., a Tamino XML database) in certain example embodiments. Of course, it will be appreciated that other data structures may be used in different embodiments.

The word and word pair index 208 may be refined and subsequently stored by applying stemming and/or other techniques, e.g., in accordance with the previously specified relevant indexing rules and parameters 206. This technique may advantageously help to unify words with the same origin and meaning in certain instances. Other refinements also are possible and may be performed in accordance with the relevant indexing rules and parameters 206. The word frequencies may be measured and analyzed in process 212, e.g., to measure the word relevance for a single document. This approach may include Word-Pair Analysis, which has been found to be particularly advantageous for the English language. A list of single words in a document tends to lose the adjacency relation to other words. Word-Pairs may also help to resolve ambiguities between single words. Such ambiguities may arise, for instance, because of a preceding or following word that negates a meaning (e.g., the word "not"), a word may have multiple meanings (e.g., words like "wound" and "table"), a word can be used as different parts of speech (e.g., the word "network" can be a noun, verb, or adjective), etc. It has been found that the adjacency relation may be maintained, that context can be maintained, and that ambiguity can be reduced, by storing the one (1) word to the left of the word in question. Of course, different embodiments may store one or more words to the left and/or right of the word in question. However, the "one word to the left" approach surprisingly and unexpectedly has been found to result in excellent clusters with high relevance between the clustered documents. The result of this analysis may be used in connection with process 214 to build a document-word matrix 216.

Semantic detection methods may be applied to help resolve these and/or other potential issues in different example embodiments. For example, in process 218, weighting techniques may be applied to the words and word-pairs in the document-word matrix 216. In certain example embodiments, LSI weighting may be used to generate an LSI-weighted document-word matrix 220. As an example, a document may be determined to include "process", "business", and "control" with document-frequencies of 14, 5, and 3. The LSI weighting, however, may adjust these values to 18.8, 12.4, and 4.6, respectively.

FIGS. 3A and 3B show example document-word and LSI-weighted document-word matrices in accordance with an example embodiment. The document collection used to produce the matrices shown in FIGS. 3A and 3B included the Tamino XML Schema Reference Guide, the Tamino XQuery Tool guide, the W3C Web Architecture description, and the W3C Semantic Web description. These documents are labeled D1-D4, respectively, in the FIGS. 3A-3B example. As can be seen, the values in the document-word matrix are adjusted based on the semantic weighting.

Thus, as will be appreciated from the foregoing description, it is possible to generate an index of words and groups of words and to reduce this index via stemming and/or other rules. Document-word frequencies may be developed and subsequently refined or weighted based on a semantic approach. It will be appreciated that the stemming, stopword, thesaurus, and/or other refining functions described herein may be applied to either or both the word and word-pair index 208 or the document-word matrix 216 in different embodiments of this invention.

Figure 4:
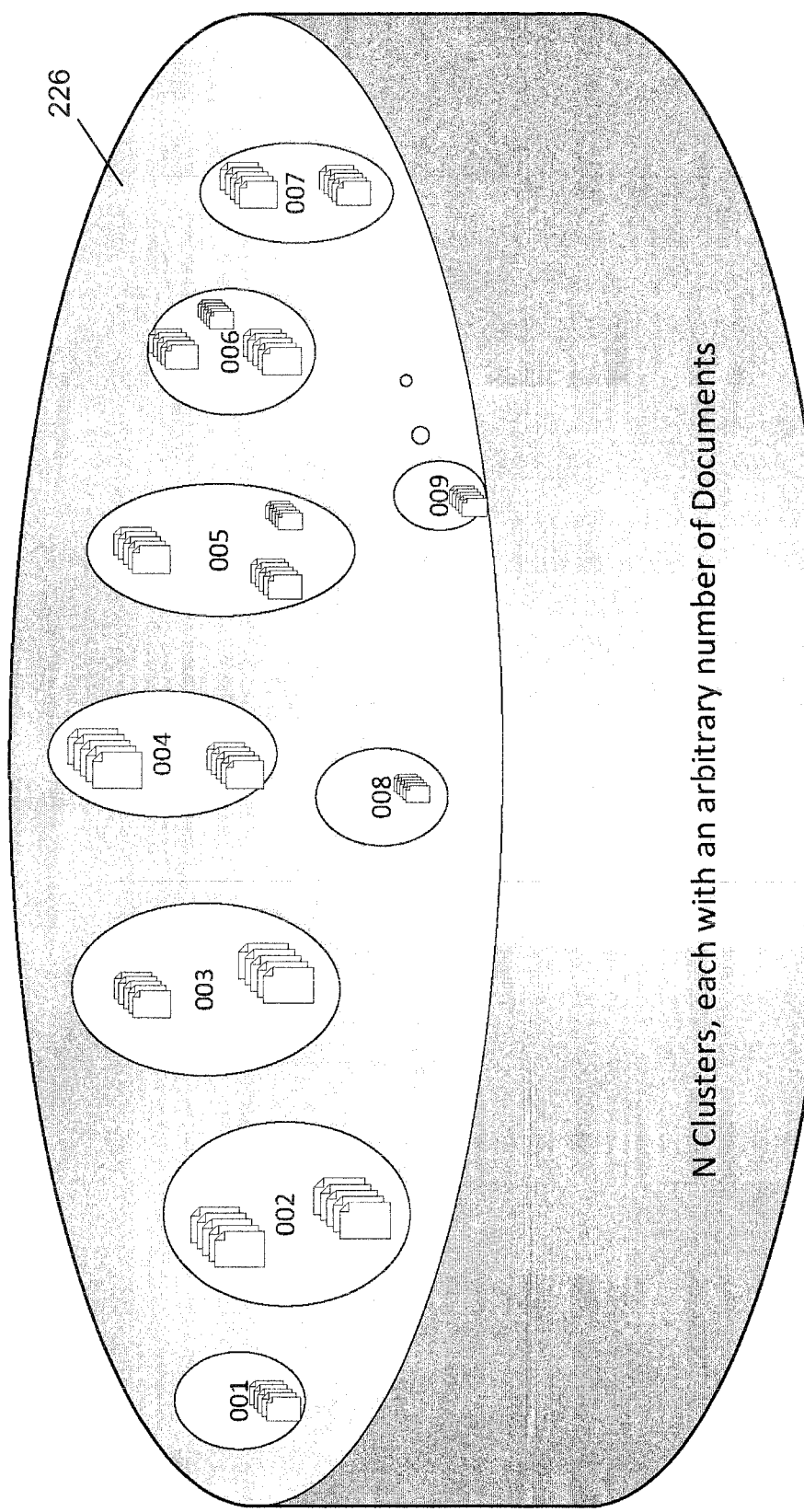
FIG. 4 schematically illustrates n-clusters, with each having an arbitrary number of documents, in accordance with an example embodiment.

Clustering may be performed using the weighed document-word matrix 220. For instance, the similarities between the documents may be calculated in process 222, and clusters may be generated from the documents in process 224. This may result in n clusters 226, with each cluster having an arbitrary number of documents therein. The result may include clusters of related words, with "buzzwords" being presented in a decreasing order of relevance. Similarity thresholds may be applied, e.g., such that linkages between documents will be maintained only if they are greater than a certain value. For instance, if the relatedness of two documents is less than a specified value (e.g., 80%), they may not be linked together. The use of a similarity threshold may help to balance the connectedness of the documents with the number of clusters that are formed. FIG. 4 schematically illustrates n-clusters, with each having an arbitrary number of documents, in accordance with an example embodiment. It will be appreciated that the term "related" may in certain instances be specific to the collection of documents and, in this sense, the approach described herein may be non-deterministic. For similar reasons, then, the various clusters may have no evident independent "names" or "meanings."

Figures 5A, 5B:
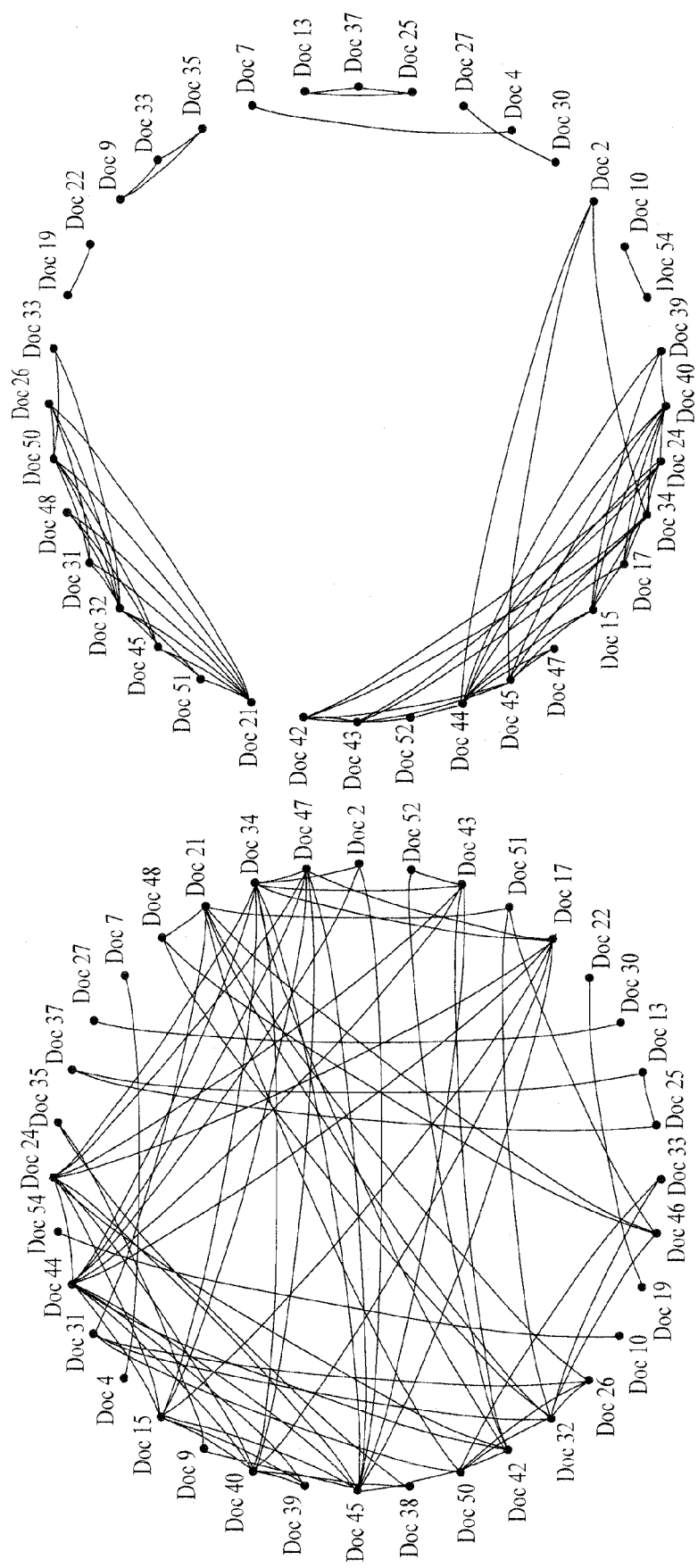
FIGS. 5A and 5B help demonstrate the advantageous effects of clustering, applying a similarity threshold, and ordering by degree of similarity that may be achieved using certain example embodiments.

FIGS. 5A and 5B help demonstrate the advantageous effects of clustering, applying a similarity threshold, and ordering by degree of similarity that may be achieved using certain example embodiments. FIG. 5A shows the linkages between 37 example documents, with those documents being located in an arbitrary order. By contrast, FIG. 5B has reordered the same documents based on their degrees of similarity. As can be seen, the clusters are much easier to identify in FIG. 5B, and the interrelatedness of the documents can be more easily discerned in FIG. 5B. It is noted that FIGS. 5A and 5B are reproduced from Manu Konchady, "Text Mining Application Programming," Charles River Media (2006), pp. 273-74, and are illustrative of advantages that are similar to those achievable by certain example embodiments of this invention.

Figure 6:
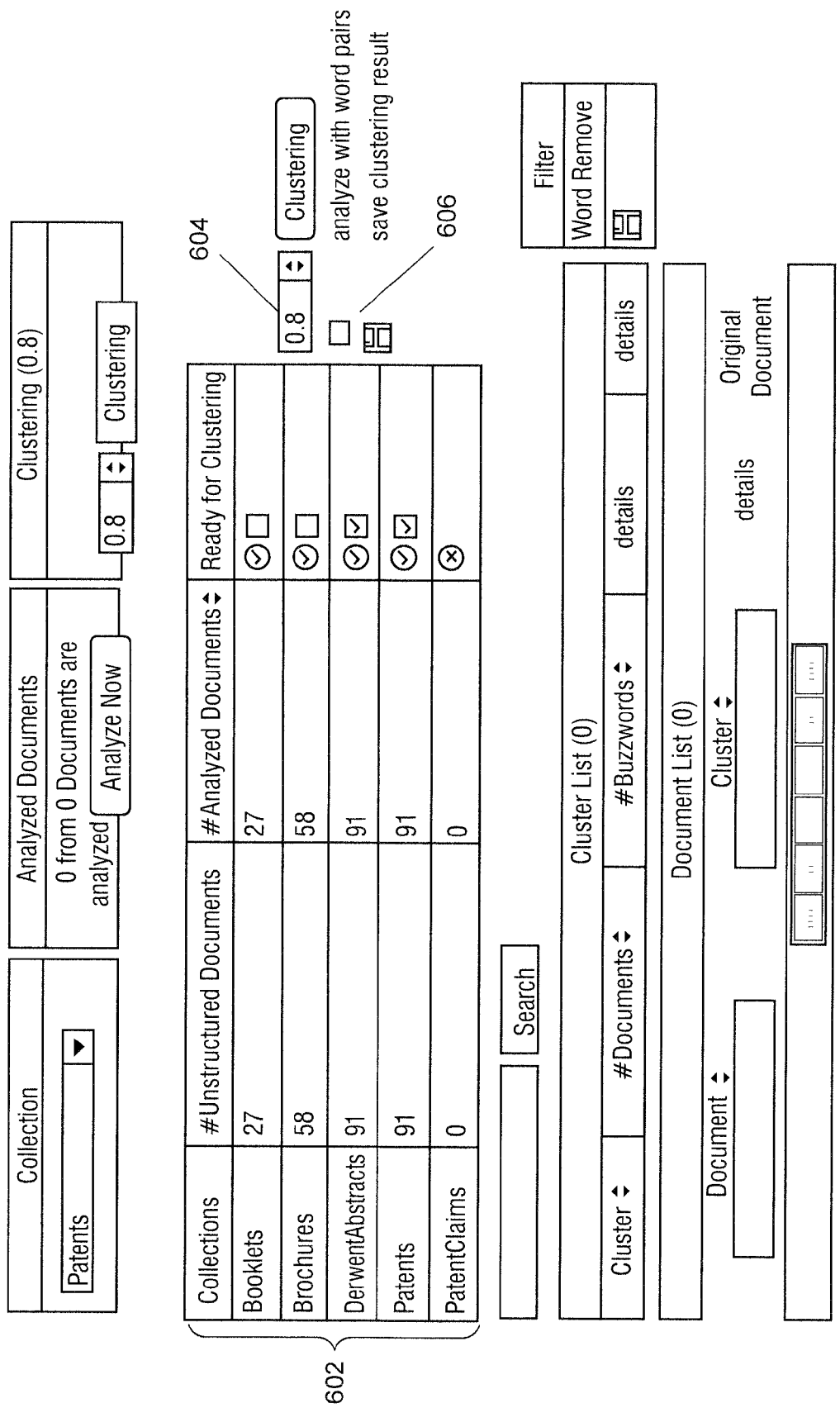
FIG. 6 is an example screenshot of a user interface that may be used in connection with certain example embodiments of this invention.

An example implementation will now be set forth with reference to FIGS. 6-10. FIG. 6 is an example screenshot of a user interface that may be used in connection with certain example embodiments of this invention. The various collections in this example implementation are set forth in the table 602. As can be seen from the table, the collections include booklets, brochures, Derwent Patent Abstracts, patents, and patent claims. The number of unstructured documents in each collection is listed, along with the number of these documents that have been analyzed. An indication is given as to whether the documents in the collections are ready for clustering. Because all of the unstructured documents in the booklets, brochures, Derwent Patent Abstracts, and patents collections are analyzed, checkmarks are shown, indicating that the documents in these collections are ready for clustering. By contrast, an "X" is shown for the patent claims collections, because there are no items in this collections, analyzed or unanalyzed. A user may select one or more collections for clustering, e.g., by clicking the appropriate checkboxes.

The user may specify the similarity threshold by adjusting the cutoff value 604. As shown in FIG. 6, the cutoff value is set to 0.8, or 80%. However, this value may be moved up or down. A user also may specify whether word pairs are to be analyzed, e.g., by clicking "analyze with word pairs" checkbox 606. Once a user has selected the collections from which the documents are to be clustered and specified a similarity threshold, the user may run the clustering analysis.

FIG. 7 shows a portion of cluster list generated from the FIG. 6 example user interface in accordance with certain example embodiments. Of the 25 clusters generated, 12 are shown in FIG. 7 (including clusters C00 to C11). The number of documents and buzzwords is shown for each cluster in the cluster list. The highest ranking buzzwords are also are listed. The parentheticals after the buzzwords indicate the number of documents that the buzzwords occur in, as well as the frequency or count of the total number of times the buzzwords occur. For example, in cluster C00, 14 of the 16 documents include the buzzword "rules", and this particular buzzword occurs 534 times in those 14 documents. A user may also filter out some buzzwords or search for specific buzzwords using the FIG. 7 example interface.

A user may obtain more detail about a particular cluster shown in the FIG. 7 example user. For instance, FIG. 8 shows a more detailed view of the first cluster shown in the FIG. 7 example user interface, which may be provided in connection with certain example embodiments. A user may use the FIG. 8 detailed user interface to view buzzwords, buzzword pairs, or both buzzwords and buzzwords pairs, e.g., by selecting the appropriate radio button. In the FIG. 8 example, both buzzwords and buzzwords pairs are shown. For instance, as can be seen from FIG. 8, buzzwords like "Rules" and buzzword pairs like "Business Rules" are shown. The same detailed information regarding document occurrence and buzzword/buzzword pair frequency as that described above in connection with FIG. 7 also is shown in the detailed FIG. 8 view.

FIG. 9 is an example screenshot showing detailed statistics for the each of buzzwords in accordance with an example embodiment. FIG. 9 also shows the documents included in the cluster. The metrics shown in the FIG. 9 table include, from the left to right, the number of documents in the particular cluster in which the buzzwords appear, the number of documents across all selected collections, a relative appearance percentage (division of column two by column three), the relative appearance count of the buzzword compared to all other buzzwords in the cluster, the relative frequency of each buzzword across all selected clusters, the total number of times the buzzword occurs within the selected cluster, the total number of times the buzzword occurs across all selected collections, and the frequency quote (division of column eight by column 9). A user may sort the results based on any of the metrics, or alphabetically based on buzzword. A search facility also is provided for locating a specific buzzword or buzzword pair.

A user may select two documents in a particular cluster or across clusters to assess their degree of similarity. For instance, FIG. 10 is an example screenshot that may be used to compare two documents in accordance with an example embodiment. Documents A and B are compared in FIG. 10, and their respective buzzwords are shown. A listing of similar buzzwords is provided above the separate buzzwords for the documents. This listing of similar buzzwords indicates, in parentheticals, the number of occurrences in Document A and in Document B. The degree of similarity is shown between the two documents. This degree of similarity may be based on the cluster value between the documents. For instance, cosine similarity may be used for clustering, and the value shown in such cases may be a measure of cohesion between the two documents in the cluster. It will be appreciated that such values may be shown for all other documents in a particular cluster or across clusters once a particular first document is selected. That is, once Document A is selected, similarity values as between Document A and Documents B, C, . . . , n may be shown.

In certain example embodiments, the analysis shown and described in connection with the example screenshots may be output to suitably formatted reports, spreadsheets, and/or the like.

The buzzwords shown in FIGS. 7-8 and 10 may be displayed in list form in certain example embodiments, e.g., as shown in these figures. Various techniques may be used to improve the readability of such lists. For instance, buzzwords may be presented in accordance with a color pattern such that adjacent buzzwords are differently colored; different font settings, styles, etc., may be used (e.g., with a pattern of bolding, underlining, italicizing; differing fonts; etc.); and/or the like. Of course, the buzzwords may be displayed in different formats other than a list in different embodiments.

Figure 11:
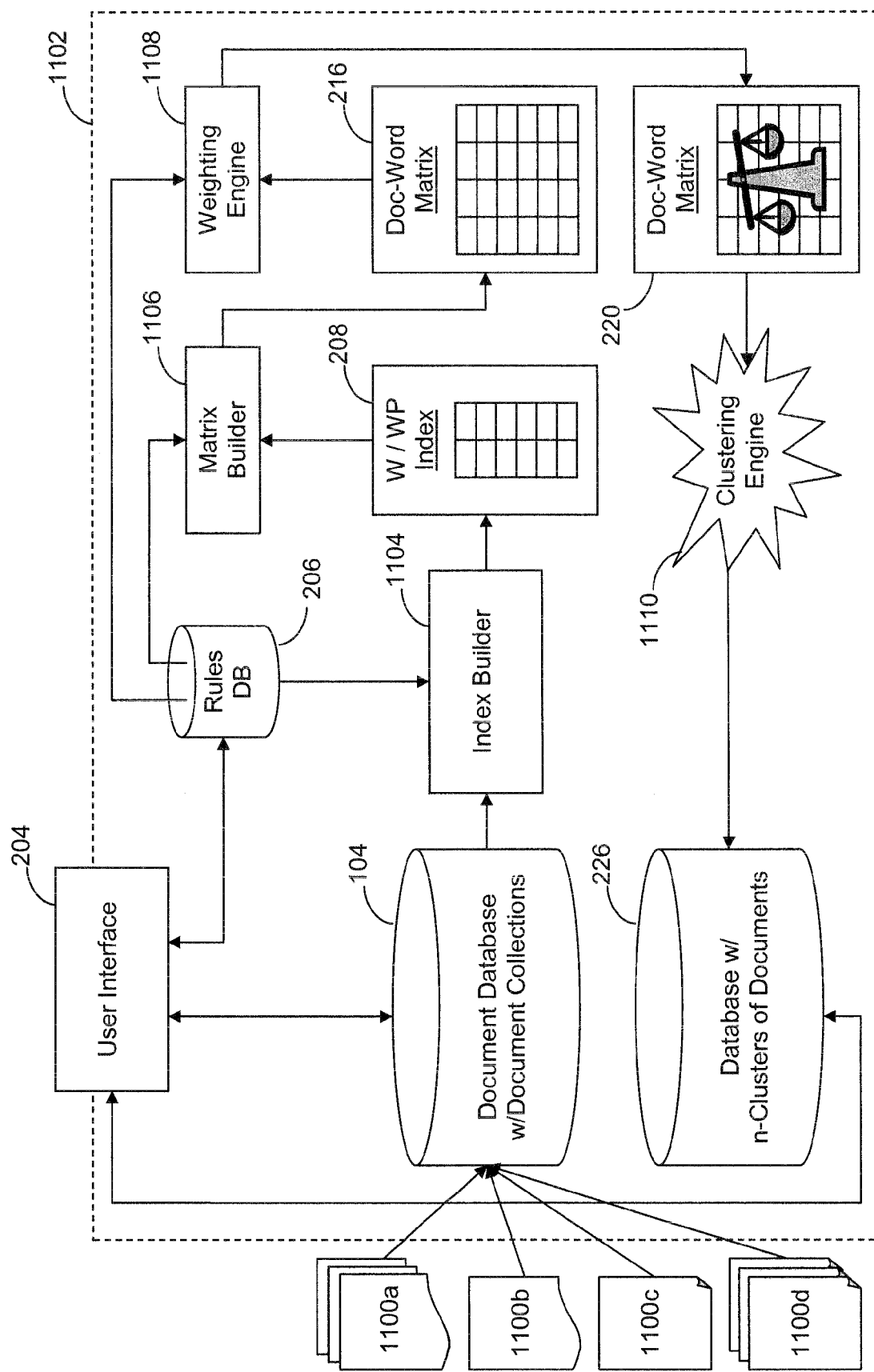
FIG. 11 is an example block diagram showing an example system 1102 for comparing and clustering documents in accordance with certain example embodiments.

FIG. 11 is an example block diagram showing an example system 1102 for comparing and clustering documents in accordance with certain example embodiments. As shown in FIG. 11, the example system 1102 includes a user interface 204 that accepts input from a user. The input from the user received via the user interface 204 may define rules or parameters for the various modules that may operate on the data. As indicated above, such rules or parameters may be stored in a rules database 206. Documents or document fragments may be incorporated individually or in bulk. FIG. 11, for instance, shows document fragments 1100a and complete documents 1100d being ingested in bulk. It also shows single document fragment 1100b and individual document 1100c being ingested separately. These documents are stored in the document database 104. Further splitting of the documents may be performed upon or following ingest, with or without direct user intervention (e.g., via the user interface 204). Similarly, categorization of the ingested assets may performed upon or following ingest, with or without direct user intervention (e.g., via the user interface 204). The rules database 206 may be consulted to determine whether and when further processing of assets is desirable for splitting and/or categorizing purpose.

The user may select one or more collections stored in the document database 104 for comparison. This may trigger the index builder 1104 to build a word/word-pair index 208. Guidelines for how to handle semantic and non-semantic words may be stored in the rules database 206 and consulted by the index builder 1104 in building the word/word-pair index 208. The index optionally may be refined, e.g., using stemming techniques, to remove words, to handle transliterations consistently, etc., and the rules for performing these refinements may be stored in the rules database 206.

The thus-refined index may be fed to a matrix builder 1106 to generate a document-word matrix 216. The rules database 206 may be consulted when the document-word matrix 216 is built. A weighting engine 1108 may run a weighting algorithm (e.g., an LSI-based weighting algorithm) on the document-word matrix 216 to generate a weighted document-word matrix 220. This weighted document-word matrix 220 may be provided to a clustering engine 1110 (which possibly is in communication with the rules database 206), which then generates a database 226 with n-clusters of documents. The user interface 206 may be used by the user to view the clusters and metrics about the clusters. Reports on detected buzzwords, their rates of occurrences in and/or across clusters, the relevance of documents in a cluster or in a pair-wise fashion, etc., may be generated for the user to peruse and optionally output to a spreadsheet, printer, file, etc.

The modules, engines, and the like may be implemented as instructions stored on a non-transitory computer readable storage medium and thus may be executed or otherwise under the control of at least one processor of at least one computer system.

Based on the clusters, a user may be able to determine how interrelated various documents are. A user also may be able to receive "good leads" as to which documents are potentially relevant when researching a particular technology area, assessing a patent portfolio, etc., e.g., by examining documents in the cluster and possibly other highly related or interconnected clusters.

Although certain example embodiments have been described as relating to intellectual property issues including prior art searches for infringement, clearance, and other purposes, the present invention is not so limited. On the contrary, it will be appreciated that the techniques described herein may be used in a variety of disciplines for a variety of applications. For instance, certain example embodiments may be used in "hard" or "soft" science research institutions for analyzing primary and/or secondary sources; for navigating through more subjective information such as that involved in recorded interviews, newspapers, brochures, pamphlets, and the like; and/or in other contexts.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for analyzing documents, the method comprising:

importing into a database a plurality of documents and/or document portions, at least some of the documents and/or document portions being structured and at least some of the documents and/or document portions being unstructured;

organizing the imported documents and/or document portions into one or more collections by splitting the documents and/or document portions into one or more sub-documents and/or sub-document portions and treating both the structured and unstructured sub-documents and/or sub-document portions as respective unstructured sub-documents and/or sub-document portions;

receiving a selection of at least one of said one or more collections;

building one or more indexes of words and/or groups of words based on each said document or document portion in each said selection;

building a document-word matrix including a value indicative of a number of times each said word and/or group of words in the index of words and/or groups of words appears in each said document or document portion in each said selection;

generating, via at least one processor, clusters of documents from the selected one or more collections using the document-word matrix, wherein each cluster includes documents having a degree of similarity above a similarity threshold and wherein at least one document is included in a plurality of clusters;

receiving a user selection of documents from one generated cluster or from different generated clusters; and in response to the user selection of the documents, calculating a degree of similarity between the selected documents.

2. The method of claim 1, further comprising:

building a weighted document-word matrix including a weighted value indicative of a number of times each said word in the index of words appears in each said document or document portion in each said selection, the weighting being performed in accordance with a semantics-based algorithm, wherein the one or more clusters of documents are generated using the weighted document-word matrix.

3. The method of claim 2, wherein the semantics-based algorithm involves Latent Semantic Indexing (LSI).

4. The method of claim 1, further comprising refining (a) the index of words and/or groups of words prior to the building of the document-word matrix and/or (b) document-word matrix, the refining being performed in accordance with one or more predefined rules.

5. The method of claim 4, wherein the one or more predefined rules include rules defining semantic and/or non-semantic stopwords and specifying how the defined semantic and/or non-semantic stopwords are to be handled.

6. The method of claim 4, wherein the one or more predefined rules include rules for standardizing transliterations or suspected transliterations.

7. The method of claim 4, wherein the one or more predefined rules include rules for applying a stemming algorithm to reduce the size of the index of words and/or groups of words prior to the building of the document-word matrix and/or the document-word matrix.

8. The method of claim 4, wherein a plurality of predefined rules are provided, the rules including rules (i) defining semantic and/or non-semantic stopwords and specifying how the defined semantic and/or non-semantic stopwords are to be handled, (ii) for standardizing transliterations or suspected transliterations, and (iii) for applying a stemming algorithm to reduce the size of the index of words and/or groups of words prior to the building of the document-word matrix and/or the document-word matrix.

9. The method of claim 4, wherein an index is built for words and for groups of words.

10. The method of claim 9, wherein the groups of words include a given word and one word immediately to the left of the given word.

11. The method of claim 1, further comprising removing linkages between documents in a given cluster when threshold values indicative of degrees of similarity between two documents are not met.

12. The method of claim 11, wherein the clustering is based on a cosine similarity calculation.

13. The method of claim 12, wherein the threshold value is 80%.

14. The method of claim 12, wherein the threshold is user-adjustable.

15. The method of claim 12, further comprising:

determining degrees of similarity between the structured and unstructured documents and/or document portions; and ordering respective structured and unstructured documents and/or documents portions in the one or more clusters based on respective degrees of similarity.

16. A non-transitory computer readable storage medium storing instructions, that when executed by at least one processor of a computer system, perform a method according to claim 1.

17. The method of claim 1, wherein building the one or more indexes of words and groups of words includes building a first index for the words and a second index for the groups of words, the first index and second index being separate indexes.

18. The method of claim 1, further comprising removing irrelevant sections from one or more documents in the database such that the removed sections are not used in building the index of words and/or groups of words.

19. The method of claim 1, wherein each cluster is independently structured from the other clusters.

20. A method for analyzing documents, the method comprising:

organizing a plurality of assets including structured and unstructured documents and/or document portions into a plurality of user-defined collections by splitting the documents and/or document portions into one or more sub-documents and/or sub-document portions and treating both the structured and unstructured sub-documents and/or sub-document portions as respective unstructured sub-documents and/or sub-document portions;

enabling a user to select one or more of said user-defined collections for subsequent analysis;

building an index of words and/or groups of words based on the documents and/or document portions in each said selected collection;

building a document-word matrix including a value indicative of a number of times each said word and/or group of words in the index of words and/or groups of words appears in each said document or document portion in each said selection;

refining the index of words and/or groups of words, and/or the document-word matrix based on predefined rules stored in a database of rules;

weighting entries in the document-word matrix based on a semantic indexing approach;

clustering together, via at least one processor, documents from the selected one or more collections in dependence on the weighted entries into a plurality of clusters, wherein each cluster includes a documents having a degree of similarity above a similarity threshold and wherein at least one document is included in a plurality of clusters;

receiving a user selection of documents from one generated cluster or from different generated clusters; and in response to the user selection of the documents, calculating a degree of similarity between the selected documents.

21. The method of claim 20, wherein the predefined rules included rules (a) defining semantic and/or non-semantic stopwords and specifying how the defined semantic and/or non-semantic stopwords are to be handled, (b) for standardizing transliterations or suspected transliterations, and/or (c) for applying a stemming algorithm to reduce the size of (1)the index of words and/or groups of words, prior to the building of the document-word matrix and/or (2)the document-word matrix.

22. The method of claim 20, further comprising removing linkages between documents in a given cluster when threshold values indicative of degrees of similarity between two documents are not met.

23. A non-transitory computer readable storage medium storing instructions, that when executed by at least one processor of a computer system, perform a method according to claim 20.

24. An asset analysis system having a memory and at least one processor, comprising:

a database configured to store a plurality of imported assets in one or more collections, the plurality of imported assets being documents and/or document portions, wherein at least some of the documents and/or document portions being structured and at least some being unstructured;

an asset splitting module, executable via at least one processor, configured to split the documents and/or document portions into sub-documents and/or sub-document portions automatically and/or based on user input and store generated sub-documents and/or sub-document portions as assets in the database assets in the database and configured to treat both the structured and unstructured sub-documents and/or sub-document portions as respective unstructured sub-documents and/or sub-document portions;

a user interface configured to enable a user to select one or more collections of the database assets for analysis;

an index builder, under control of the at least one processor, configured to access from the database assets belonging to the one or more selected collections and generate a word and/or groups of words index, the word and/or groups of words index including a listing of words appearing in the accessed assets;

a rules database configured to store a plurality of user-defined rules for refining the word and/or groups of words index and/or the document-word matrix;

a matrix builder, under control of the at least one processor, configured to build a document-word matrix including a value indicative of a number of times each said word and/or group of words in the index of words and/or groups of words appears in each said accessed database asset;

an index refining module, under control of the at least one processor, configured to refine the word and/or groups of words index and/or the document-word matrix, based on rules stored in the rules database;

a weighting engine, under control of the at least one processor, configured to weight entries in the document-word matrix based on a semantic indexing approach;

a clustering engine, under control of the at least one processor, configured to cluster together documents from the selected one or more collections into a plurality of clusters in dependence on the weighted entries, wherein each cluster includes documents having a degree of similarity above a similarity threshold and at least one document is included in a plurality of clusters;

the user interface being further configured to receive a user selection of documents from one generated cluster or from different generated clusters; and a calculating engine, under control of the at least one processor, configured to in response to the user selection of the documents, calculate a degree of similarity between the selected documents.

25. The system of claim 24, wherein the rules in the rules database include rules (a) defining semantic and/or non-semantic stopwords and specifying how the defined semantic and/or non-semantic stopwords are to be handled, (b) for standardizing transliterations or suspected transliterations, and (c) for applying a stemming algorithm to reduce the size of the index of words and/or groups of words prior to the building of the document-word matrix and/or the document-word matrix.

26. The system of claim 24, wherein an index is build for words and for groups of words.

27. The system of claim 26, wherein the groups of words include a given word and one word immediately to the left of the given word.

28. The system of claim 24, wherein the clustering engine is further configured to remove linkages between documents in a given cluster when threshold values indicative of degrees of similarity between two documents are not met.

29. The system of claim 24, wherein the clustering is based on a cosine similarity calculation.

30. The system of claim 24, wherein the threshold value is 80%.

31. The method of claim 24, wherein the threshold is user-adjustable.

* * * * *